United States Patent

[11] 3,576,353

| [72] | Inventors | Noble G. Barker<br>Pekin;<br>Charles N. Fangman; Walter R. Gutzwiller;<br>Marion J. Witzenburg, Peoria, Ill. |
|---|---|---|
| [21] | Appl. No. | 819,230 |
| [22] | Filed | Apr. 25, 1969 |
| [45] | Patented | Apr. 27, 1971 |
| [73] | Assignee | Caterpillar Tractor Co.,<br>Peoria, Ill. |

[54] CONNECTING ROD BEARING
4 Claims, 7 Drawing Figs.

[52] U.S. Cl. .................................................. 308/15, 74/579
[51] Int. Cl. ............................................. F16c 13/00, G05g 1/00
[50] Field of Search ........................................... 74/15, 579

[56] References Cited
UNITED STATES PATENTS

| 1,130,982 | 3/1915 | Kinkead | 74/579 |
|---|---|---|---|
| 2,235,976 | 3/1941 | Best | 74/579 |
| 2,434,080 | 1/1948 | Rosa | 74/579 |
| 3,390,925 | 7/1968 | Fangman | 308/15 |
| 3,428,372 | 2/1969 | Keller et al. | 308/15 |

FOREIGN PATENTS

| 526,309 | 9/1940 | Great Britain | 74/579 |
|---|---|---|---|

Primary Examiner—Fred C. Mattern, Jr.
Assistant Examiner—Wesley S. Ratliff, Jr.
Attorney—Fryer, Tjensvold, Felix, Phillips & Lempio ABSTRACT: A connecting rod bearing providing with V-shaped tabs for accurately aligning and locking the bearing half shells to a strap type bearing cap and connecting rod end.

INVENTORS
NOBLE G. BARKER
CHARLES N. FANGMAN
WALTER R. GUTZWILLER
MARION J. WITZENBURG

BY

ATTORNEYS

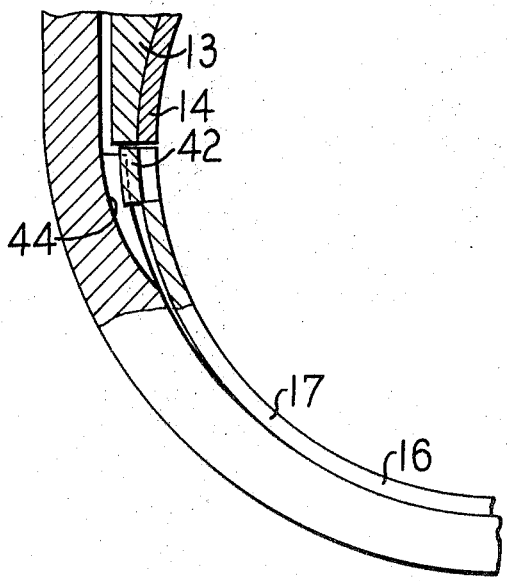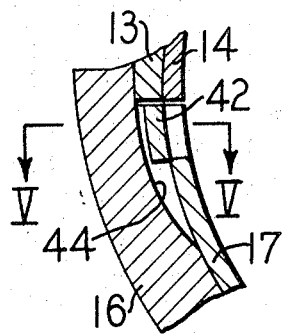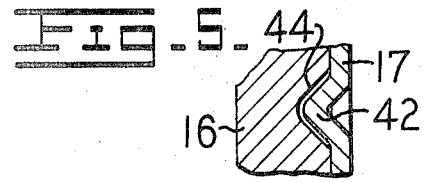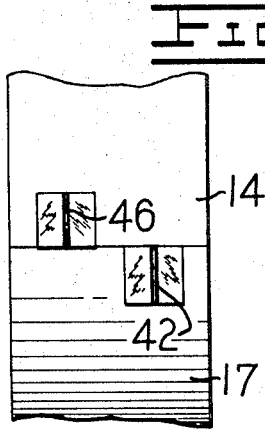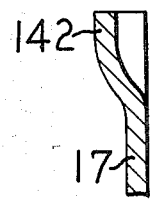

3,576,353

CONNECTING ROD BEARING

BACKGROUND AND SUMMARY OF THE INVENTION

This invention relates to connecting rod bearings and particularly to such bearings used in a flexible strap-type bearing cap which has a varying cross section through its lower half. The advantages of using such bearing caps, together with bearing half shells having tabs which fir into notches in the bearing caps and the big end bearing portion of a connecting rod, has been set forth in great detail in U.S. Pat. No. 3,390,925, issued July 2, 1968, and assigned to the assignee hereof.

In that application, it was disclosed that a flexible strap having a cross section which varies from a minimum at the center to a maximum at the end portions serves to distribute the moment of inertia proportionally to the bending moment applied during spreading of the strap, and also to distribute pressure evenly about the circumference of the bearing shell to provide substantially 180° of bearing contact between the piston rod and the crankshaft bearing.

The cited patent also describes the use of outwardly projecting tabs on the bearing shells which are received in vertically aligned notches in the strap and the big end portion for the purpose of positioning the bearing and the strap. In using assemblies manufactured in accordance with the previous teaching however, the flexible strap, in its relaxed position, is free from engagement with the rod. When assembling the connecting rod assembly to the crankshaft, the upper bearing half is inserted into the rod, which is then urged against the crankshaft journal. As the spread of the strap will not allow the lower bearing half to be held within the strap, the lower end of the rod must be brought below the horizontal centerline of the bore and the tabs on the lower bearing half snapped into the slots within the lower bearing half.

The next step is to secure the strap cap to the rod. This is sometimes a difficult assembly procedure and, using the rectangular or square tabs, it is sometimes hard to determine whether or not the bearing tab is in the rod tab slot on assembly when the strap is pulled in with the rod bolt. When the tabs are not within the notches, drawing of the strap toward the rod may cause the tabs to be flattened by mashing them into the bearing shell, thereby eliminating the lock required to prevent the bearing from turning or moving axially along the crankshaft journal. Even if the tabs are not mashed, their being out of the slots may result in bearing-to-crankshaft journal interference and bearing damage.

Therefore, it is an object of the present invention to provide a bearing tab and notch which will obviate the above described disadvantages.

It is also an object of this invention to provide a bearing assembly wherein the bearing tabs are formed in such fashion that they cannot be out of the notches when the strap is drawn toward the connecting rod.

Other objects and advantages of the present invention will become apparent from the following description and claims as illustrated in the accompanying drawings which, by way of illustration, show a preferred embodiment of the present invention and principles thereof and what is now considered to be the best modes contemplated for applying these principles. It is recognized that other embodiments of the invention utilizing the same or equivalent principles may be used, and structural changes may be made as desired by those skilled in the art, without departing from the present invention and purview of the appended claims.

BRIEF DESCRIPTION OF THE DRAWINGS

FIG. 3 is a partial elevation of the lower half of the bearing cap, prior to bolting the cap to the rod;

FIG. 4 is a view similar to FIG. 3, with the lower bearing cap securely bolted to the rod;

FIG. 5 is a sectional illustration of the lower bearing cap and bearing shell taken along a line V–V of FIG. 4;

FIG. 6 is a view of the upper and lower bearing shells taken along a line VI–VI of FIG. 1; and FIG. 7 is a view of an alternate method of forming the bearing V-tabs.

DETAILED DESCRIPTION

Figure 1:
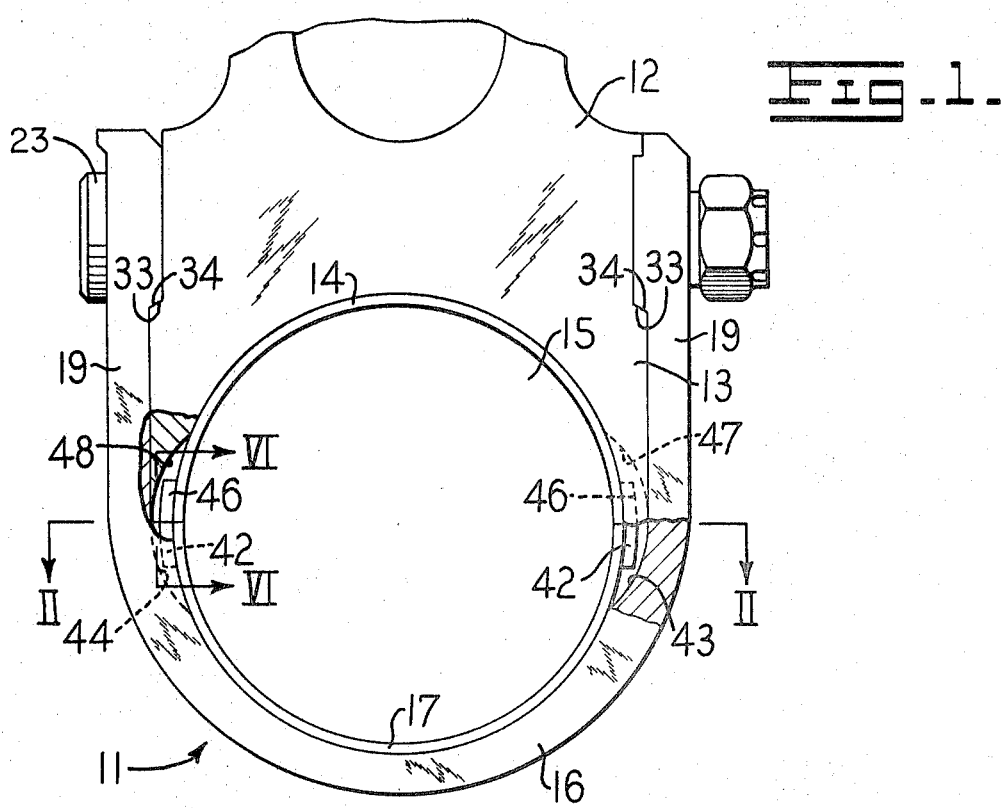
FIG. 1 is an elevation view, partly in section, of a connecting rod and strap-type bearing cap assembly constructed in accordance with one embodiment of the present invention.
Figure 2:
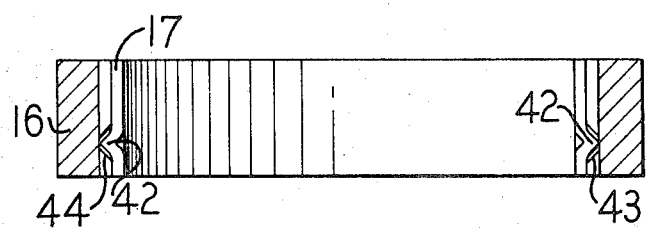
FIG. 2 is a sectional illustration of the assembly taken along a line II–II of FIG. 1.

In FIGS. 1—6, a bearing constructed in accordance with one embodiment of the present invention is indicated generally by the reference numeral 11. The bearing 11 comprises a connecting rod 12 having a big end bearing portion 13 in which an upper bearing half shell 14 is disposed for engagement with the upper surface of a crankshaft journal 15.

A bearing cap 16 holds a lower bearing half shell 17 in position against the lower surface of the journal 15.

In accordance with the present invention, the bearing cap 16 is formed as a flexible strap-type cap to exert a substantially uniform pressure about the entire 180° of the journal 15 encompassed by the lower bearing shell 17. As described in greater detail in the above cited U.S. Pat. No. 3,390,925, this uniform distribution of pressure is achieved through the variation in the cross section between the lowermost, center portion of the strap 16, and the portion adjacent the uppermost end of the bearing shell 17. The strap 16 includes upstanding end portions 19 which extend alongside the big end bearing portion 13 of the connecting rod. The ends 19 may each be formed with a suitable bolt hole, so sized as to accommodate assembly and slight vertical movement produced in the strap during assembly. The big end bearing portion 13 is likewise formed with a bolt hole, and a tie bolt 23 may be passed through the strap and connecting rod to clamp the strap in the position illustrated.

Each of the upstanding ends 19 may have a slot for reception of a dowel pin to maintain the strap in a fixed position transversely of the connecting rod. This feature is known in the art and has not been illustrated.

Each of the upstanding ends 19 is formed with an inclined surface 33 which mates with a corresponding inclined surface 34 on the big end bearing portion 13 of the connecting rod. The engagement of these inclined surfaces during tightening of the tie bolt 23 produces a sliding ramp affect which lifts the strap 16 and presses the bearing 17 into engagement with the lower surface of the journal 15.

The bearing shells 14 and 17 incorporate tab constructions which afford means for locating and locking the shells in fixed transverse positions on the connecting rod and the strap, respectively.

The lower bearing shell 17 is formed with outwardly projecting, V-shaped tabs 42 which are received within V-shaped notches 43 and 44 in the strap 16.

V-shaped tabs 46 are formed in the upper bearing shell 14 and these tabs are inserted within notches 47 and 48 in the big end portion 13 of the connecting rod. If desired, both bearing shells may be bonded in position by epoxy resin or other suitable means.

The V-shaped tabs 42 are designed to protrude from the bearing back by an amount greater than the amount of spread of the strap-type cap 16, to enable the tabs to stay engaged within the grooves 43 and 44, even with the strap spread, as illustrated in FIG. 3. Thus, the requirement that the piston rod big end portion 13 extend below the horizontal centerline of the journal 15 is eliminated. Because of the wedge shape of the tab, closing of the strap—to the position illustrated in FIG. 4—by tightening bolt 23 allows the bearing tab to align itself with the slot in the rod, thus obviating the possibility of the tabs being crushed between the crankshaft journal and the connecting rod 4.

In assembling the complete bearing, the upper bearing half 14 is inserted into the big end bearing portion 13 of the rod 12, such that the tabs 46 fit within grooves 47 and 48 in the rod end. The lower bearing half shell 17 is inserted into the strap cap 16 and the cap is then located on the rod end so as to be secured thereto by bolt 23.

As shown in FIGS. 3, 4 and 6, when the bearings 14 and 17 are inserted within big end portion 14 and strap 16 respectively, the V-shaped tabs 42 and 46 are situated, relative to the axial direction of the bearing shells, so as to be directly opposite a solid structural member. Thus, tabs 42 are held against rotation by the solid section of big end 13 and tabs 46 are held against rotation by solid portion of strap 16. In this manner, the bearing shells are prohibited from rotating and, unless desired, the necessity of bonding the bearing shells into position is overcome.

In FIG. 7, an alternate embodiment of the present invention has been illustrated which is similar to that previously described.

In the first described embodiment, tabs 42 and 46 are illustrated as being shaped by a machining process, such as a punching operation, wherein the portion of the bearing at the inner end of the tab has been severed. On the other hand, the tabs 142 and 146 in FIG. 7 are illustrated as being formed by some process such as rolling or drawing. This is the sole distinction between the two embodiments and may result in greater manufacturing economy.

Thus, the applicants have illustrated and described preferred embodiments of the invention which produces a true advancement in the bearing art, which embodiments may be altered and modified by those skilled in the art without exceeding the purview of the following claims.

We claim:

1. In a connecting rod bearing assembly the combination comprising:
   a. a connecting rod having a big end bearing portion in which an upper bearing half shell is disposed for engagement with the upper surface of a crankshaft journal;
   b. a flexible strap-type cap in which a lower bearing half shell is disposed for engagement with the lower surface of the crankshaft journal;
   c. the flexible strap having a cross section which decreases toward the center and also having upstanding end portions which, in a relaxed state, tend to assume a position free from engagement with the big end bearing portion;
   d. a tie bolt which passes through the ends of the flexible strap and big end bearing portion to clamp the strap to the connecting rod;
   e. the upper and lower bearing shells having vertically aligned V-shaped tab means respectively received in vertically aligned notch means located on the big end bearing portion and the flexible strap, and the V-shaped tab means on the lower bearing shell being of such size, relative to the notch means in the flexible strap, as to fit within the notch means when the flexible strap is in the relaxed position, whereby drawing of the strap toward the rod causes the V-shaped tab means to cooperate with their respective notches to transversely position said bearing shells with respect to said big end bearing portion and said strap so that flattening and mashing of said tab means is obviated.

2. The connecting rod bearing assembly of claim 1 wherein the notch means in the big end bearing portion abuts a solid section of the flexible strap.

3. The connecting rod bearing assembly of claim 1 wherein the notch means in the flexible strap abuts a solid section of the big end bearing portion.

4. In a connecting rod bearing assembly the combination comprising:
   a. a connecting rod having a big end bearing portion in which an upper bearing half shell is disposed for engagement with the upper surface of a crankshaft journal;
   b. a flexible strap-type cap in which a lower bearing half shell is disposed for engagement with the lower surface of said crankshaft journal;
   c. said flexible strap having a cross section which decreases toward the center and also having upstanding end portions which, in a relaxed state, tend to assume a position free from engagement with said big end bearing portion;
   d. a tie bolt which passes through the ends of the flexible strap and big end bearing portion to clamp the strap to the connecting rod;
   e. mating inclined surfaces formed on both the upstanding end portions of said flexible strap and the big end bearing portion for lifting the upstanding ends of the strap on tightening of the tie bolt to press said upper and lower bearing half shells into contact with the journal under an evenly distributed pressure;
   f. said upper bearing half shell having a vertically aligned V-shaped tab means which is received in vertically aligned notch means on said big end bearing portion for locating and accurately aligning said upper bearing half shell within said big end bearing portion;
   g. lower bearing half shell having vertically aligned V-shaped tab means which are received within notches on the flexible strap when the flexible strap is in the relaxed position whereby drawing of the strap toward the rod causes the V-shaped tab means to cooperate with their respective notches to transversely position said bearing shells with respect to said big end bearing portion and said strap so that flattening and mashing of said tab means is obviated.